Figure 1:
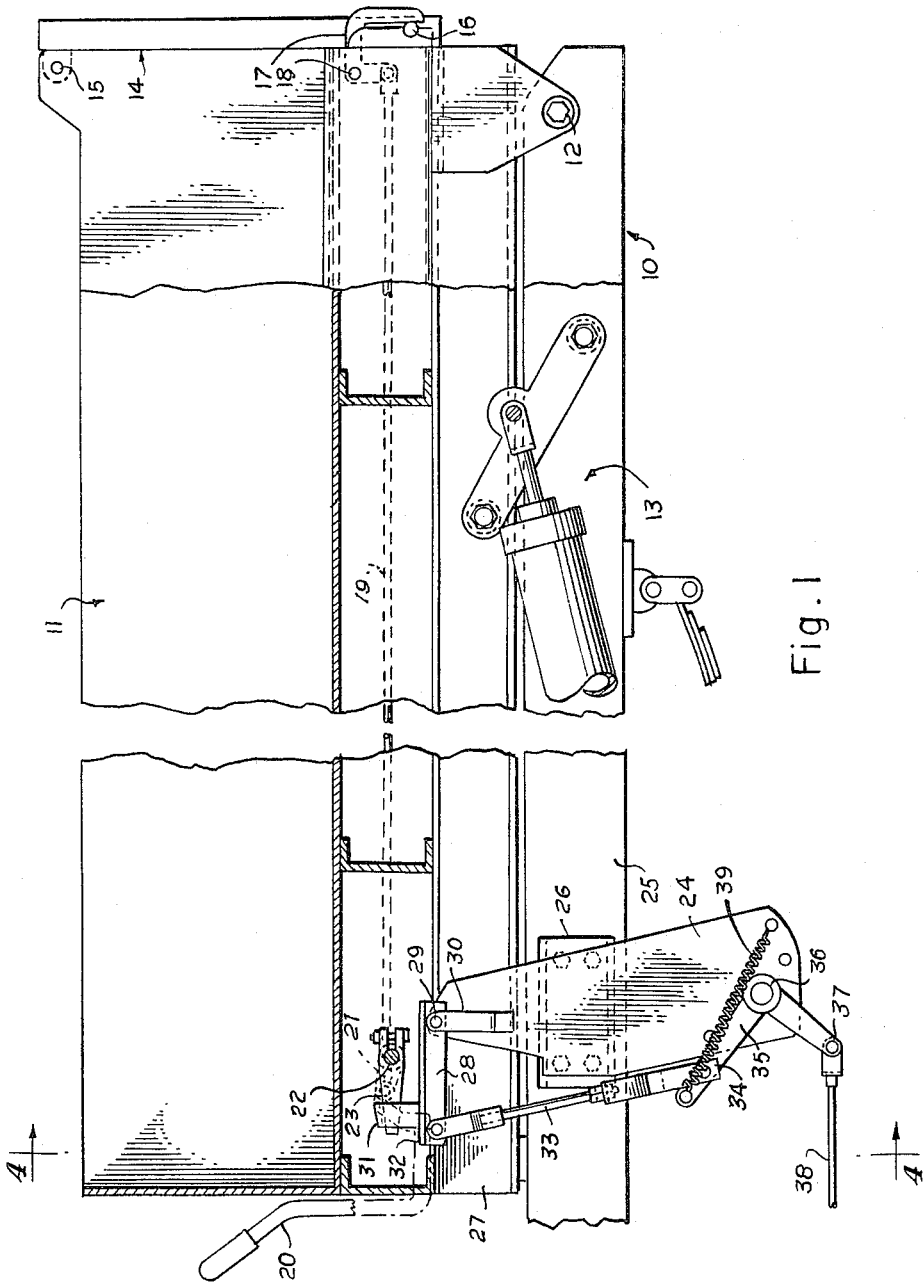

Nov. 29, 1966  W. A. BARTSCH  3,288,531
TAIL GATE CONTROL MECHANISM FOR DUMP TRUCKS
Filed June 24, 1965  3 Sheets-Sheet 2

INVENTOR.
William A. Bartsch
BY
*Cecil L. Wood*
ATTORNEY

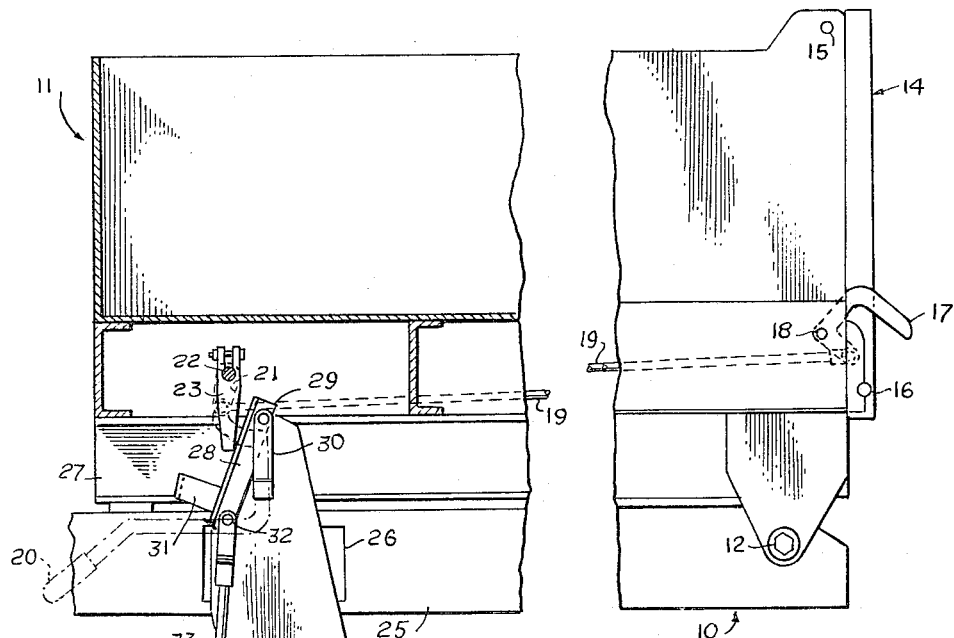
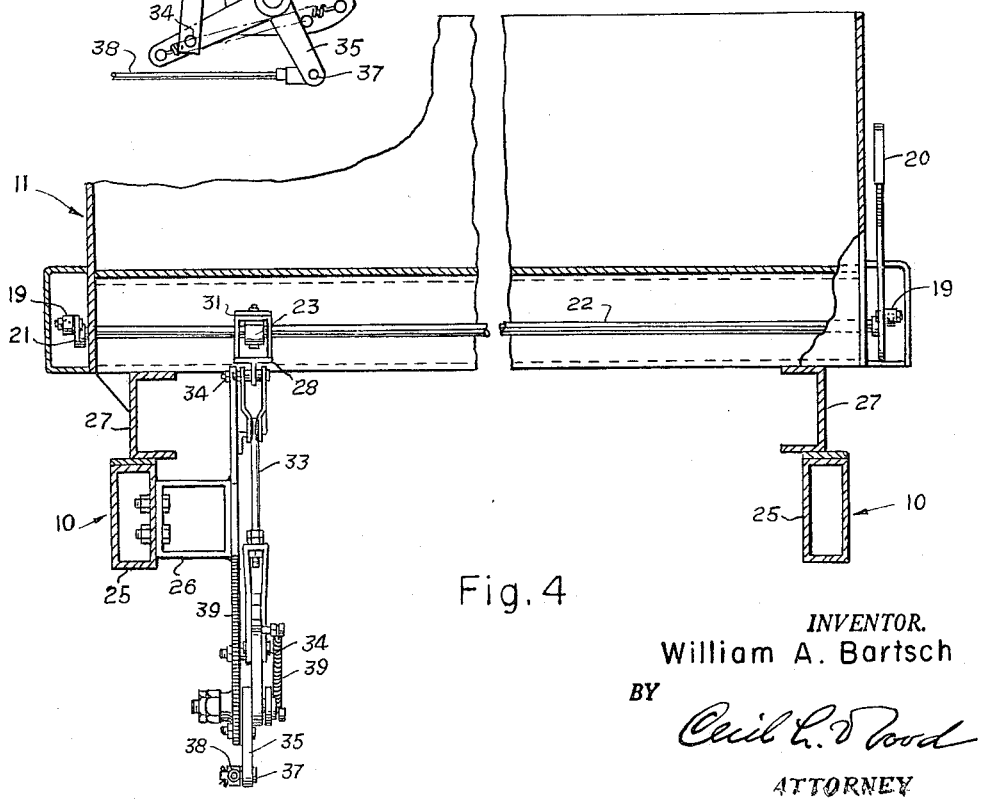

United States Patent Office 3,288,531
Patented Nov. 29, 1966

3,288,531
TAIL GATE CONTROL MECHANISM FOR
DUMP TRUCKS
William A. Bartsch, 2002 W. Illinois, Dallas, Tex.
Filed June 24, 1965, Ser. No. 466,621
4 Claims. (Cl. 298—23)

This invention relates to latch means for securing the tail gate of a dump truck or other like vehicle, and it has particular reference to a latch mechanism as described having separable, coacting portions arranged upon the frame of the vehicle and the bed thereof, respectively, and operable from inside the cab of the vehicle.

In one type of dump truck now in use, having latch means for securing the tail gate as hereinafter described, the bed of the truck is pivotally connected to the truck frame rearwardly thereof and is raised and lowered hydraulically, and the tail gate is pivotally connected to the truck bed on opposite sides, near the top thereof, and swings upwardly and rearwardly about its pivots to open.

Said last mentioned latch means includes a pair of pins which extend laterally outwardly from opposite sides of the tail gate adjacent the bottom thereof and a pair of substantially C-shaped latch elements which are pivotally connected intermediate their ends to opposite sides of the truck bed, said latch elements being swung about their pivots whereby they are hooked over said pins and disengaged therefrom.

A pair of elongated rods, which are pivotally connected at one end to the respective latch elements adjacent one end thereof, extend forwardly of the truck bed, on opposite sides thereof, and are pivotally connected at their opposite ends to an intermediate portion of an elongated lever and an end portion of a relatively shorter crank arm, respectively, which are in turn rigidly connected to opposite ends of a shaft which extends transversely of the truck bed, forwardly thereof, and is journaled thereon for rotation about its axis, said shaft with said lever and said crank arm forming a crank whereby said latch elements are movable in and out of latching engagement with said pins, to thereby secure the tail gate in its latched position and to unlatch it.

An important feature of the truck structure and the latch means therefor above described is that the latch elements as well as the operating crank therefor and the connecting linkage are arranged wholly upon the truck bed. Said elongated lever, which serves as a handle for said operating crank, necessarily is positioned outside the cab of the truck, forwardly of the truck bed. Said latch means is operable manually as described, and it is necessary for the operator to reach outside the cab of the truck to secure the tail gate and to unlatch it, as the case may be, by operation of said crank.

A prime object of the invention is that of providing latch means for securing the tail gate of a dump truck or other like vehicle having separable, coacting portions arranged upon the frame of the vehicle and the bed thereof, respectively, and operable from inside the cab of the vehicle.

A further object of the invention resides in the provision of latch means as described whereby the tail gate of a dump vehicle may be unlatched automatically, in response to the raising of the bed of the vehicle by hydraulic means about its pivotal connections with the frame thereof, and having manually operable means including a lever positioned inside the cab of the vehicle whereby the tail gate may be positively and conveniently latched in the lowermost position of the bed of the vehicle relative to the frame thereof.

Broadly, the invention contemplates the provision of latch means as described which advantageously may be incorporated in the latch means of existing dump vehicles, as an addition thereto and without substantial alteration thereof, whereby said latch means is also operable manually from outside the cab of the vehicle, by operation of the crank above described, independently of the position of the bed of the vehicle relative to the frame thereof.

While the foregoing objects are paramount, other and lesser objects will become apparent as the description proceeds, when considered in connection with the appended drawings wherein:

FIGURE 1 is a longitudinal elevational view, partly in section, showing fragmentarily the frame and bed of a dump truck having conventional latch means as above described, and having latch means embodying the invention as hereinafter described incorporated therein, as an addition to said first mentioned latch means, showing the truck bed in its lowermost position relative to the frame thereof and showing the tail gate securely latched.

Figure 2:
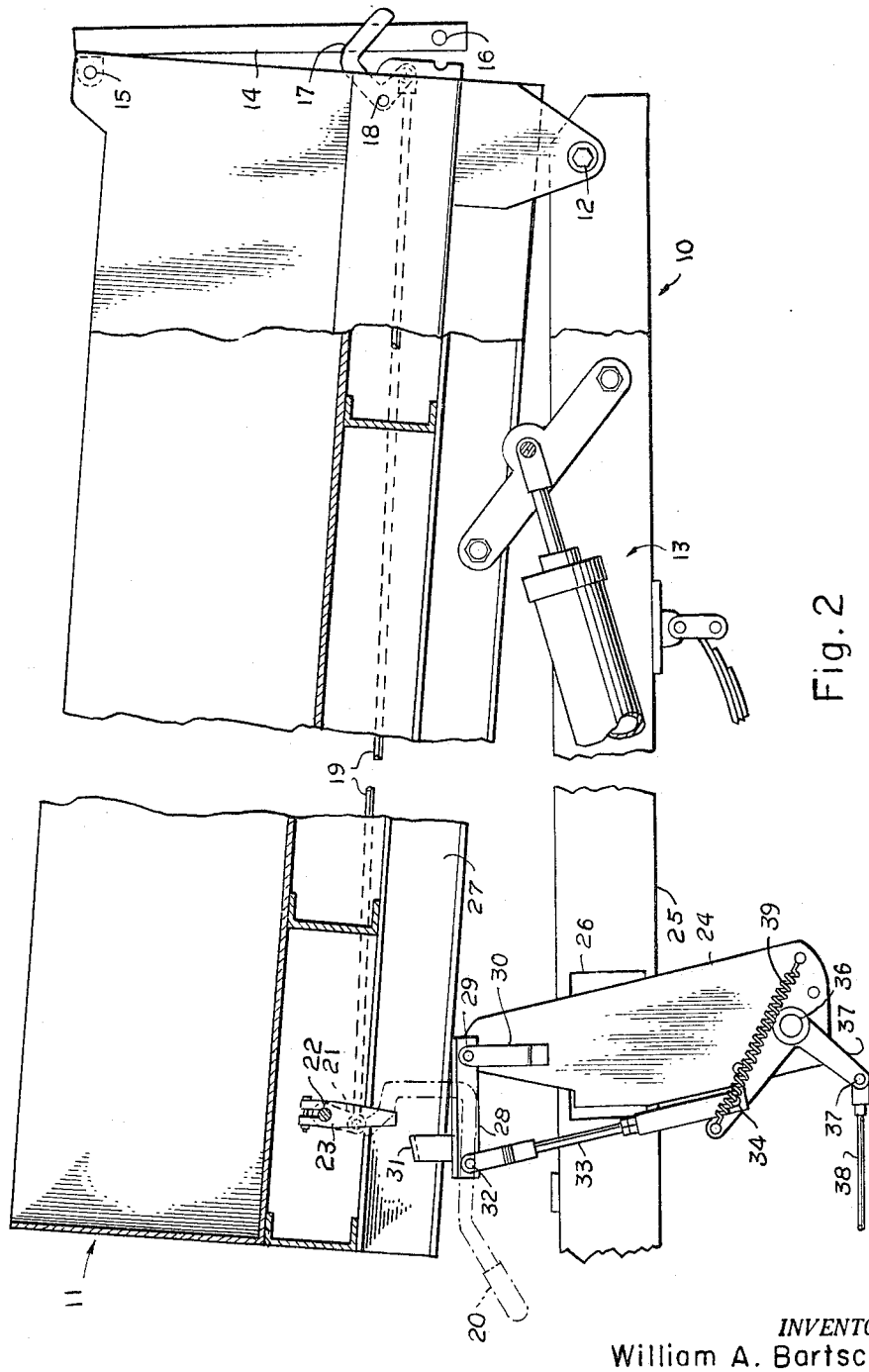

FIGURE 2 is a view similar to FIGURE 1, showing the truck bed in a partly raised position relative to the frame thereof, and showing how the tail gate is unlatched automatically in response to the raising of the truck bed relative to its frame.

FIGURE 3 is a view similar to FIGURE 2, showing the truck bed again lowered relative to the frame thereof and showing the tail gate still unlatched, showing how the latch means of the invention is cocked automatically, in response to the lowering of the truck bed relative to its frame, preparatory to securing the tail gate in its latched position by said manually operable means, and FIGURE 4 is a transverse sectional elevational view taken on the line 4—4 of FIGURE 1.

The drawing shows fragmentarily a conventional dump truck as above described having a frame, designated generally by the numeral 10, and having a bed, indicated generally by the numeral 11, supported on the frame 10 and pivotally connected thereto, rearwardly thereof, as at 12, and having hydraulic means, indicated generally by the numeral 13, whereby the bed 11 may be raised and lowered, about the pivotal connections 12, relative to the frame 10.

A tail gate, indicated generally by the numeral 14, is pivotally connected to opposite sides of the bed 11 near the top thereof, as at 15, and is swung rearwardly and upwardly about the pivotal connections 15 to open.

In accordance with the usual practice, the tail gate 14 has latch means as hereinafter described, all of which is conventional, whereby the tail gate 14 may be securely latched by manually operable means on the bed 11, forwardly thereof, independently of the inclination of the bed 11 relative to the frame 10.

Said last mentioned latch means includes a pair of pins 16 which extend laterally outwardly from opposite sides of the tail gate 14 adjacent the bottom thereof and a pair of substantially C-shaped latch elements 17 which are pivotally connected intermediate their ends to opposite sides of the bed 11, as at 18. The latch elements 17 are swung about the pivotal connections 18 whereby they are hooked over the pins 16 and disengaged therefrom.

A pair of elongated rods 19, which are pivotally connected at one end to the respective latch elements 17 adjacent one end thereof, extend forwardly of the bed 11, on opposite sides thereof, and are pivotally connected at their opposite ends to an intermediate portion of an elongated lever 20 and an end portion of a relatively shorter crank arm 21, respectively, which are in turn rigidly connected to opposite ends of a shaft 22 which extends transversely of the bed 11, forwardly thereof, and is journaled thereon for rotation about its axis. The shaft 22 with the lever 20 and the crank arm 21 form a crank whereby the latch elements 17 are movable in and out of latching engagement with the pins 16, to thereby secure the tail gate 14 in its latched position and to unlatch it.

The structure above described is conventional, as stated. As has been pointed out, the latch elements 17 as well as the crank having the lever 20 and the connecting rods 19 are arranged wholly upon the bed 11. The lever 20, which serves as a handle for said crank, necessarily is positioned outside the cab of the truck, forwardly of the bed 11. The latch means described is operable manually by means of the lever 20, and it is necessary for the operator to reach outside the cab of the truck to secure the tail gate 14 and to unlatch it, as the case may be, by operation of said crank having the lever 20.

The latch means of this invention has separable, coacting portions as hereinafter described which are arranged upon the frame 10 and the bed 11, respectively, and is operable from inside the cab of the truck (not shown).

The portion of the latch means of this invention which is arranged upon the bed 11 consists substantially in its entirety of the structure above described, including the pins 16, the latch elements 17, the elongated rods 19, and the crank having the elongated lever 20, the crank arm 21, and the shaft 22, and in addition, an elongated lug 23 having one of its ends rigidly and removably connected to the crank shaft 22 intermediate its ends.

The elongated lug 23 extends generally parallel to the crank arm 21, which is relatively shorter, and the corresponding end portion of the lever 20, which is bent intermediate its ends, and is movable rotatively therewith about the axis of the crank shaft 22 from a first position, as shown in FIGURES 1 and 4, in which it extends forwardly of the crank shaft 22, to a second position, as shown in FIGURES 2 and 3, in which it depends therefrom.

The latch means of this invention further includes an elongated, planar supporting element, designated generally by the numeral 24, which is disposed vertically below, and in laterally spaced relation to the elongated lug 23, parallel to the longitudinal axis of the frame 10 and on the side of the frame 10 opposite the crank lever 20, and is rigidly and removably connected to the inner side of a longitudinal frame member 25, in spaced apart relation thereto, by bolts which are passed through said frame member 25 and an integral spacer element 26 on said planar supporting element 24. Said planar supporting element 24 extends above and below said frame member 25, between said frame member 25 and a like frame member 25 on the opposite side of the frame 10, and between a pair of longitudinally extending sub-frame members 27 which support the bed 11.

An elongated cam member 28, which is positioned directly below the elongated lug 23, has one of its ends pivotally connected to the planar supporting element 24 by a bolt 29 which extends between the planar supporting element 24 and an upstanding bracket 30 thereon. The bolt 29 extends parallel to the crank shaft 22, below the crank shaft 22 and in laterally spaced relation thereto, and the cam member 28 is movable pivotally about the bolt 29, in abutting engagement with the depending end portion of the elongated lug 23, as shown best in FIGURE 3, and coacts therewith as hereinafter described to rotate the lug 23 from its depending position relative to the crank shaft 22, as shown in FIGURES 2 and 3, to its forwardly extending position, as shown in FIGURES 1 and 4, whereby the crank shaft 22 is turned with the lug 23 and the latch elements 17 are secured in latching engagement with the pins 16.

The elongated cam member 28 has an upstanding, integral inverted U-shaped element 31 on the end thereof opposite the bolt 29 which is engageable over the end portion of the elongated lug 23 opposite the crank shaft 22, as shown best in FIGURES 1 and 4, whereby the crank shaft 22 is secured against rotative movement about its axis to thereby prevent disengagement of the latch elements 17 from the pins 16.

Upon raising the bed 11 relative to the frame 10, as shown in FIGURE 2, the crank shaft 22 is rotated about its axis, by abutment of the elongated lug 23 with the inverted U-shaped element 31, whereby the tail gate 14 is automatically unlatched by disengagement of the latch elements 17 with the pins 16.

As the bed 11 is again lowered relative to the frame 10, as shown best in FIGURE 4, the cam member 28 is movable pivotally about the bolt 29 in a downward direction by abutment of the depending end portion of the elongated lug 23 against it, whereby the latch means of the invention is cocked, as hereinafter more fully explained, preparatory to securing the tail gate 14 in its latched position.

Pivotal movement of the cam member 28 about the bolt 29 in a downward direction is limited by abutment of the cam member 28 against the lower end portion of the upstanding bracket 30.

The end of the cam member 28 opposite the bolt 29 is pivotally connected, as at 32, to one end of a longitudinally adjustable link 33 which has its opposite end pivotally and adjustably connected, as at 34, to one end of an angularly bent lever 35.

The lever 35 is pivotally connected intermediate its ends, as at 36, to the planar supporting element 24 and has the end thereof opposite the link 33 pivotally connected, as at 37, to one end of a link 38 which has its opposite end connected to a lever (not shown) in the cab of the truck.

The lever 35 is biased against movement in either direction about its pivot 36 by a pair of tension springs 39, each of which has one of its ends connected to the planar supporting element 24.

The arrangement is such that the tail gate 14 may be securely latched by operation of the last mentioned lever, whereby the cam member 28 is movable upwardly about the bolt 29 to turn the elongated lug 23 with the crank shaft 22, the latch means first having been cocked, as shown in FIGURE 3, by abutment of the depending end portion of the elongated lug 23 against the cam member 28, whereby the cam member 28 is movable downwardly about the bolt 29, whereby the position of said last mentioned lever is reversed, in response to downward movement of the bed 11 relative to the frame 10.

The invention may be modified within certain limitations, by persons skilled in the art, without departing from the spirit and intent thereof or the scope of the appended claims.

What is claimed is:

1. In combination with a dump vehicle having a cab, and having a frame extending rearwardly of the cab, a bed supported on the frame and pivotally connected thereto, rearwardly thereof, and having hydraulic means for raising and lowering the bed about its pivotal connections with the frame, a tail gate pivotally connected to opposite sides of the bed adjacent the top thereof, and latch means for securing the tail gate in its closed position including a pair of pins extending laterally outwardly from opposite sides of the tail gate near the bottom thereof, a pair of substantially C-shaped latch elements pivotally connected intermediate their ends to opposite sides of the bed and engageable over said pins in one position thereof, a pair of elongated connecting rods each having one of its ends pivotally connected to one of said latch elements and extending longitudinally of the bed, on opposite sides thereof, and a crank forwardly of the bed including a shaft extending transversely of the bed and journaled thereon for rotation about its axis, and an elongated lever and a relatively shorter crank arm rigidly connected to opposite ends of said shaft, perpendicular to said shaft and in parallel relation to each other, the ends of said connecting rods opposite said latch elements being pivotally connected to an intermediate portion of said lever and an end portion of said crank arm whereby said latch elements are movable in and out of latching engagement with said pins by operation of said crank, the combination of an elongated lug having one of its ends rigidly and removably connected to said crank shaft intermediate its ends, in substantially parallel relation to said crank arm and the adjacent end portion of said lever, and movable rotatively with said crank shaft from a first position, in which it extends forwardly of said crank shaft, to a second position in which it depends therefrom, a planar supporting element below said elongated lug, in laterally spaced relation thereto, parallel to the longitudinal axis of the frame, rigidly and removably connected to the inner side of a longitudinal frame member, in spaced apart relation thereto, and extending above and below it, between opposite sides of a sub-frame supporting the bed, an elongated cam member having one of its ends pivotally connected to said planar supporting element, immediately below said elongated lug, and movable pivotally about an axis parallel to and below said crank shaft, in laterally spaced relation thereto, said cam member being movable upwardly about its pivot, in abutting engagement with said elongated lug, whereby said crank shaft is rotated about its axis and said latch elements are engaged with said pins, said cam member having an integral inverted U-shaped member on the end thereof opposite its pivot engageable over the end of said elongated lug opposite said crank shaft in the forwardly extending position of said lug whereby said crank shaft is secured against rotation about it axis, and manually operable means including a lever in the cab of the vehicle and linkage operatively connecting said lever to the end of said cam member opposite its pivot whereby said cam member is urged upwardly about its pivot in abutting engagement with said elongated lug, in the depending position of said lug, to secure said tail gate in its latched position, by manipulation of said last mentioned lever.

2. The structure of claim 1, the arrangement being such that said elongated lug is movable pivotally about the axis of said crank shaft, and depends therefrom, upon raising the bed relative to the frame, by abutting engagement of the end of said lug opposite said crank shaft with said inverted U-shaped member, whereby said latch elements are automatically disengaged from said pins.

3. The structure of claim 2, the arrangement being such that said cam member is movable downwardly about its pivot, upon lowering the bed relative to the frame, by abutting engagement of said elongated lug, in its depending position, with said cam member, whereby said cam member is cocked, and the position of said last mentioned lever is reversed, preparatory to manually securing the tail gate in its latched position by operation of said last mentioned lever.

4. The structure of claim 1, said linkage operatively connecting the lever in the cab of the vehicle to the end of said cam member opposite its pivot comprising an angularly bent lever pivotally connected to said planar supporting element below said elongated cam member, a link connecting the end of said cam member opposite its pivot to one end of said angularly bent lever, a link connecting the opposite end of said angularly bent lever to the lever in the cab of the vehicle, and a tension spring having one of its ends connected to said planar supporting element and acting on said angularly bent lever to bias it against movement in either direction about is pivot.

References Cited by the Examiner

UNITED STATES PATENTS

| | | | |
|---|---|---|---|
| 2,261,745 | 11/1941 | Sand | 298—23 |
| 2,342,939 | 2/1944 | Hutchinson | 298—38 |
| 2,530,346 | 11/1950 | Wolf | 298—23 |
| 2,552,442 | 5/1951 | McClish | 298—23 |

BENJAMIN HERSH, *Primary Examiner.*

R. J. JOHNSON, *Assistant Examiner.*